(12) United States Patent
Aoyagi et al.

(10) Patent No.: US 9,088,557 B2
(45) Date of Patent: Jul. 21, 2015

(54) ENCRYPTION KEY MANAGEMENT PROGRAM, DATA MANAGEMENT SYSTEM (71) Applicant: HITACHI SOLUTIONS, LTD., Tokyo (JP)

(72) Inventors: Makoto Aoyagi, Tokyo (JP); Minoru Fujimoto, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 75 days.

(21) Appl. No.: 13/944,946

(22) Filed: Jul. 18, 2013

(65) Prior Publication Data
US 2014/0181514 A1 Jun. 26, 2014

(30) Foreign Application Priority Data

Dec. 25, 2012 (JP) ................. 2012-280469

(51) Int. Cl.
H04L 29/06 (2006.01)
H04L 9/08 (2006.01)

(52) U.S. Cl.
CPC .............. *H04L 63/08* (2013.01); *H04L 9/0833* (2013.01); *H04L 9/0869* (2013.01); *H04L 63/065* (2013.01); *H04L 2463/062* (2013.01)

(58) Field of Classification Search
CPC ...................................... H04L 63/08
USPC ................................................. 713/168
See application file for complete search history.

(56) References Cited

U.S. PATENT DOCUMENTS

| 6,694,025 | B1 * | 2/2004 | Epstein et al. | 380/279 |
| 2004/0042620 | A1 * | 3/2004 | Andrews et al. | 380/286 |
| 2004/0153642 | A1 * | 8/2004 | Plotkin et al. | 713/150 |
| 2009/0214043 | A1 * | 8/2009 | Choi et al. | 380/279 |

FOREIGN PATENT DOCUMENTS

JP 2007-011511 A 1/2007

* cited by examiner

*Primary Examiner* — Peter Shaw
(74) *Attorney, Agent, or Firm* — Mattingly & Malur, PC (57) ABSTRACT An objective of the present invention is to ensure security of the file sharing function provided by cloud storages without significantly decreasing the convenience of cloud storages. The encryption key management program according to the present invention encrypts, using authentication information of a user, a group shared key shared in a user group and stores it as an encrypted group shared key. The encryption key management program, upon receiving a request from a user, sends the encrypted group shared key corresponding to the requesting user.

10 Claims, 8 Drawing Sheets

ENCRYPTION KEY MANAGEMENT PROGRAM, DATA MANAGEMENT SYSTEM

CLAIM OF PRIORITY

The present application claims priority from Japanese patent application JP 2012-280469 filed on Dec. 25, 2012, the content of which is hereby incorporated by reference into this application.

BACKGROUND OF THE INVENTION

1. Field of the Invention

The present invention relates to a technique for managing data files using cloud storages.

2. Background Art

In recent years, it has become discussed to utilize in business public cloud storage services which have been provided for consumers. The file sharing function provided by public cloud storage services is one of advantages in using cloud storages. However, a lot of users are anxious in terms of security when using public cloud storages in business. Thus public cloud storages are generally used for personal use only so far. Therefore, as one of security measures, a scheme has been developed in which files stored in cloud storages are encrypted before operation. In association with this scheme, software products that implement encrypting files stored in cloud storages are available in the market. However, only few products achieve both the file sharing function of public cloud storage services and the encryption.

JP Patent Publication (Kokai) No. 2007-11511 A describes, in a case where a plurality of users shares encrypted files without using cloud storages, a system in which the encrypted files are stored in a removable medium and the encrypted files can be decrypted only on computers that are used by user groups permitted in advance.

SUMMARY OF THE INVENTION

In the file exchange using removable media as described in JP Patent Publication (Kokai) No. 2007-11511 A, it is necessary to carry the removable medium storing the encrypted files when the stored information is to be carried to outside of the user group. Therefore, if the removable medium is lost, broken, or the like, the data itself cannot be restored. In addition, when sharing the encrypted files among a plurality of users simultaneously, it is necessary to prepare and distribute removable media for each of users and is also necessary to notify the users of information for decryption such as encrypting password in advance. Therefore, it has problems in terms of immediacy, convenience, or safety. Further, it is possible to decrypt the encrypted files as long as the encrypted files and information for decryption such as password are available. Thus it has problems in terms of security.

Next, it is assumed that cloud storages are used as alternative measures instead of file sharing using removable media. It is possible to share files between users inside and outside of users' own groups by utilizing the file sharing function provided by public cloud storage services. However, security risks such as information leakage due to operational mistakes by service operators managing the cloud storages or hackings to the cloud storages may arise. Thus more advanced security measures are required.

Encrypting files stored on cloud storages may be conceivable as security measures for cloud storages. However, encrypting files using password requires disclosing the password to a plurality of users in order to share the files, which has problems in terms of safety. Encrypting whole of the cloud storages may be conceivable as another measure. However, it may easily lead to information leakage if the user providing the shared file mistakes in setting access privileges.

The present invention is made in the light of above-described problems, and it is an objective of the present invention to ensure security of the file sharing function provided by cloud storages without significantly decreasing the convenience of cloud storages.

The encryption key management program according to the present invention encrypts, using authentication information of a user, a group shared key shared in a user group and stores it as an encrypted group shared key. The encryption key management program, upon receiving a request from a user, sends the encrypted group shared key corresponding to the requesting user.

With the encryption key management program according to the present invention, it is possible to enhance safety without significantly decreasing the convenience of cloud storages.

DETAILED DESCRIPTION OF THE PREFERRED EMBODIMENTS

Figure 1:
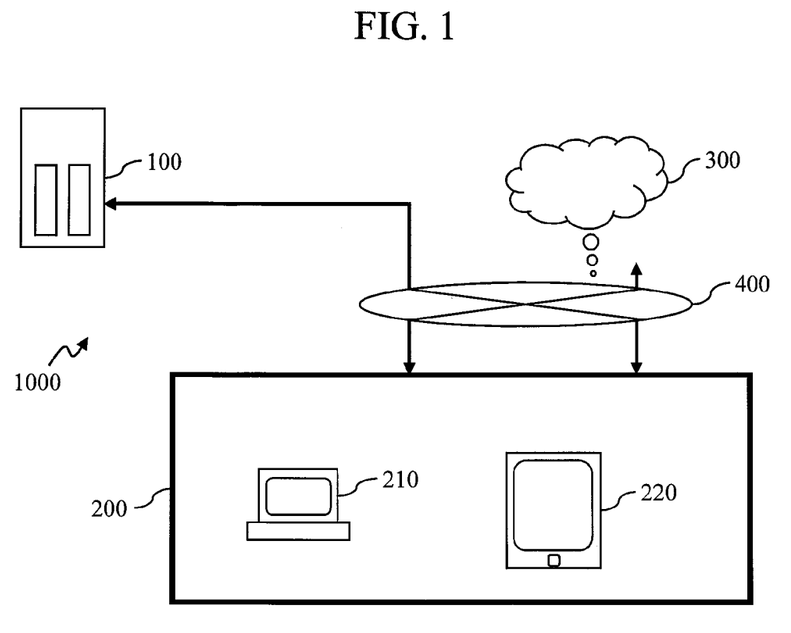
FIG. 1 is a configuration diagram of a data management system 1000.

FIG. 1 is a configuration diagram of a data management system 1000 according to the present invention. The data management system 1000 includes a management server 100, a client terminal 200, and a cloud storage 300, which are connected with each other through a network 400 such as the Internet.

The management server 100 works as an authentication server that manages user IDs of users who use the client terminal 200 and groups to which each of the users belongs. In addition, the management server 200 manages encryption keys that the client terminal 200 uses when encrypting data files as described in FIG. 2 later.

The client terminal 200 encrypts data files using encryption keys acquired from the management server 100, and stores the encrypted data files in the cloud storage 300. In addition, the client terminal 200 decrypts the encrypted data files acquired from the cloud storage using the encryption keys acquired from the management server 100. When the client terminal 200 acquires the encryption keys from the management server 100, it is necessary to be authenticated by the management server 100. For the sake of simplifying the description, it is assumed that authentication is not necessary when accessing the cloud storage 300. However, an authentication may be performed at that time. The client terminal 200 is a computer such as a personal computer 210 or a mobile terminal 220. Hereinafter, those computers are collectively referred to as the client terminal 200.

The cloud storage 300 stores data files encrypted by the client terminal 200. The cloud storage 300 comprises storage devices that are connected to the network 400 and is capable of reading and writing data through the network 400. The service provider providing the cloud storage 300 is not necessarily the service providers to which the management server 100 (and its components) or the client terminal 200 belongs.

Figure 2:
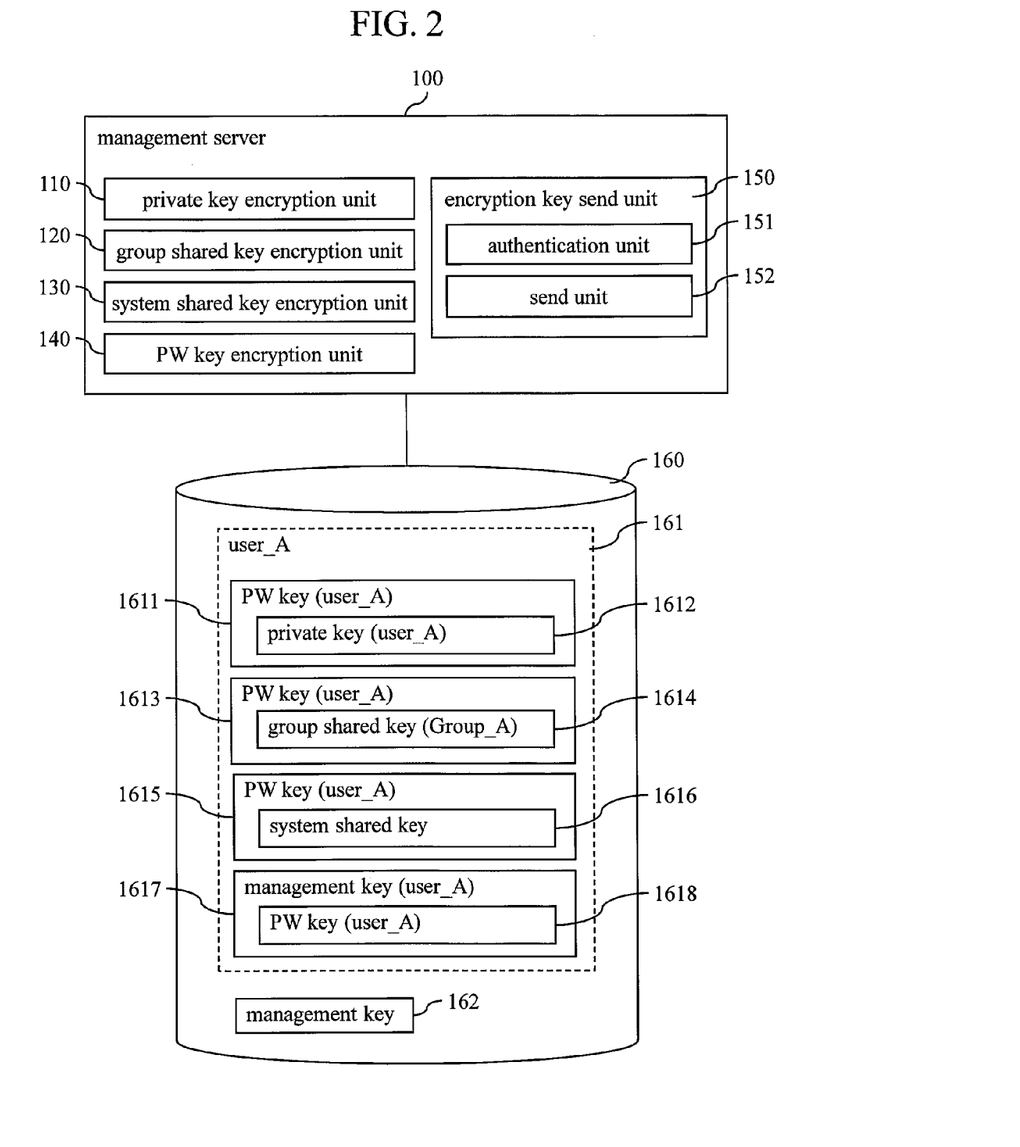
FIG. 2 is a functional block diagram showing details of a management server 100.

FIG. 2 is a functional block diagram showing details of the management server 100. The management server 100 encrypts, using authentication information of each of users, encryption keys that the client terminal 200 uses when encrypting data files, and manages the encrypted encryption keys. The management server 100 sends the encrypted encryption keys in response to requests from the client terminal 200.

The management server 100 includes a private key encryption unit 110, a group shared key encryption unit 120, a system shared key encryption unit 130, a PW key encryption unit 140, an encryption key send unit 150, and a database 160. The encryption key send unit further includes an authentication unit 151 and a send unit 152. The functional units other than the database 160 will be further described after FIG. 3 mentioned below.

The database 160 is a database managing encryption keys that the client terminal 200 uses when encrypting data files. There are three types of the encryption keys. A private key 1612 is an encryption key that is unique to each of users who uses the client terminal 200. A group shared key 1614 is an encryption key that is shared in a user group to which the user who uses the client terminal 200 belongs. A system shared key 1616 is an encryption key that is shared in the data management system 1000.

The database 160 stores, as each of records in a user table 161 provided for each of users, the above-mentioned three types of keys that are encrypted using authentication information of each of users. For the sake of simplifying the description, it is assumed that the management server 100 authenticates each of users by passwords, and that the management server 100 encrypts the three types of keys using the passwords as encryption keys (hereinafter, referred to as a PW key 1618). The records 1611, 1613, and 1615 are pieces of data corresponding to the private key 1612, the group shared key 1614, and the system shared key 1616 encrypted by the PW key 1618, respectively.

The user table 161 further stores, as a record 1617, the PW key 1618 for each of users that are encrypted by a management key 162 managed by the system administrator. The management key 162 is stored in a storage area other than that of storing the user table 161. For example, the management key 162 can be stored in a session management area. Even in a case where users forget the password, it is possible for the administrator to decrypt the PW key 1618 using the management key 162, to decrypt the private key 1612, the group shared key 1614, and the system shared key 1616 respectively, to issue a new password, and to re-encrypt each of the encryption keys using the new password. Namely, even in a case where the encryption key is doubly encrypted as shown in FIG. 2, it is possible to reissue authentication information.

The database 160 can be configured using storage devices such as hard disk devices. Other functional units can be configured using hardware such as circuit devices implementing these functions or can be configured by arithmetic devices such as CPUs (Central Processing Unit) that executes programs implementing these functions. If these functional units are implemented by programs, these functional units correspond to "encryption key management program" and can be stored in computer readable storage media (e.g. recording devices such as memory, hard disk, or SSD (Solid State Drive), recording media such as IC card, SD card, or DVD). The management server 100 corresponds to "encryption key management apparatus".

Figure 3:
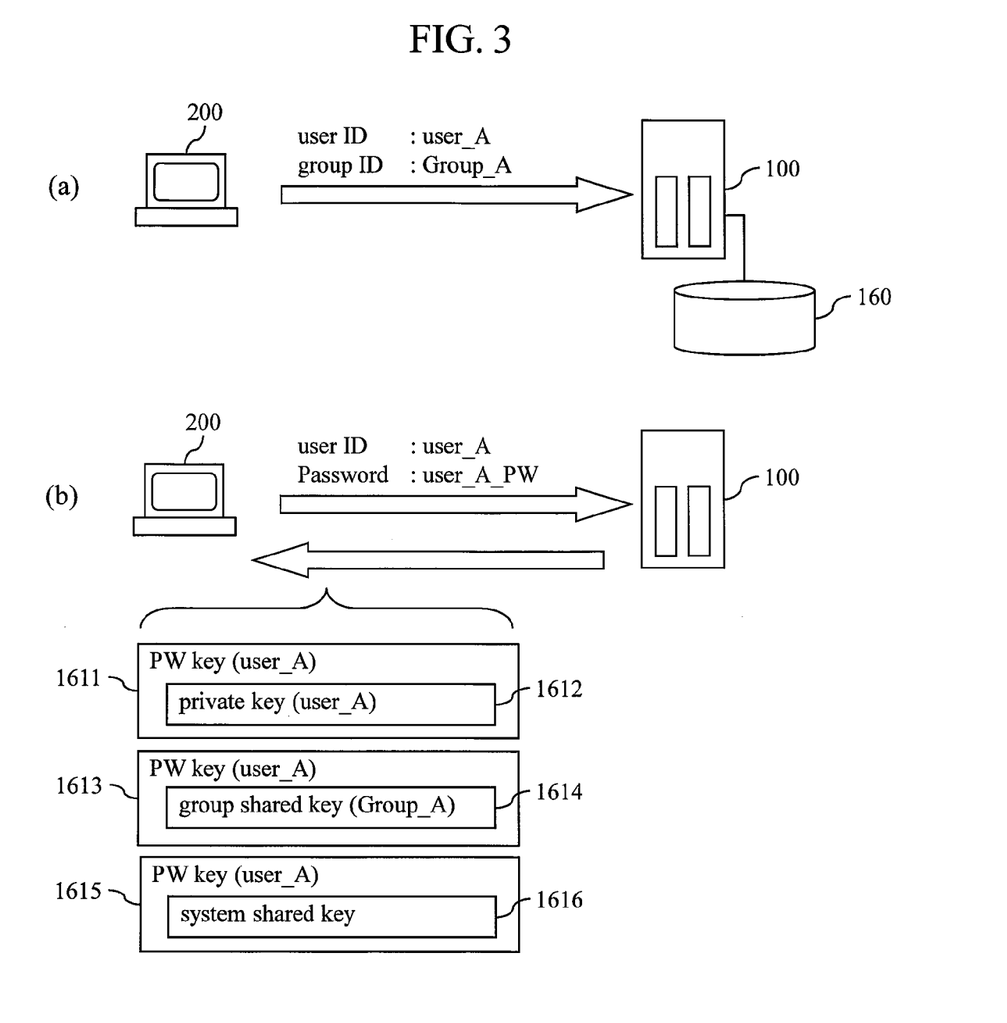
FIG. 3 is diagram showing a user authentication process performed by the management server 100.

FIG. 3 is a diagram explaining a user authentication process performed by the management server 100. FIG. 3(*a*) shows a process to register a new user. FIG. 3(*b*) shows a process to authenticate the registered user. Hereinafter, each of processes will be described with an example of processes regarding user_A.

User_A is a user of the client terminal 200. User_A accesses the management server 100 and requests to register user_A as a new user. It is possible to specify Group_A as a user group to which user_A is to be belonged along with the request. It is also possible to delegate to the management server 100 about the user group to which user_A belongs. In addition, a password for authenticating user_A may be specified at the same time. Hereinafter, it is assumed that the management server 100 designates a password automatically.

If the authentication unit 151 receives, from the client terminal 200, a request to register user_A as a new user, the authentication unit 151 issues a password user_A_PW that corresponds to user_A. The authentication unit 151 saves the relation between user_A and user_A_PW. After that, user_A can login to the management server 100 using the password user_A_PW. The process for registering new users may be automated. Alternatively, the administrator may register new users after determining whether the user is allowed to be registered as a new user.

The authentication unit 151 generates a private key 1612 that is unique to user_A by using, for example, random numbers. If Group_A is a new group, the authentication unit 151 generates a group shared key 1614 that is unique to Group_A by using for example random numbers similarly. The system shared key 1616 and the management key 162 are generated using appropriate processes in advance.

The private key encryption unit 110 encrypts the private key 1612 using the password user_A_PW or a value that is uniquely derived from user_A_PW as the PW key 1618. The private key encryption unit 110 stores the encrypted private key 1612 as the record 1611 in the user table 161. The correspondence between user_A and the record 1611 may be defined by associating the user ID of user_A with the record 1611, or may be defined by creating the user table 161 for each of users.

The group shared key encryption unit 120 and the system shared key encryption unit 130 similarly encrypt the group shared key 1614 and the system shared key 1616 respectively using the PW key 1618, and store the encrypted keys as a record 1613 and a record 1615 respectively. The PW key encryption unit 140 copies the PW key 1618, encrypts the copied key using the management key 162, and stores it as a record 1617.

When the user of the client terminal 200 encrypts or decrypts data files, it is necessary to login to the management server 100 and to acquire each of encryption keys. The user sends, to the management server 100, the user ID user_A and the password user_A_PW using the client terminal 200. The authentication unit 151 performs an authentication using the user ID and the password. If the user is authenticated, the send unit 152 reads out the private key 1612, the group shared key 1614, and the system shared key 1616 that are corresponding to the user and sends the keys to the client terminal 200. Note that these three keys are still encrypted by the PW key 1618.

Figure 4:
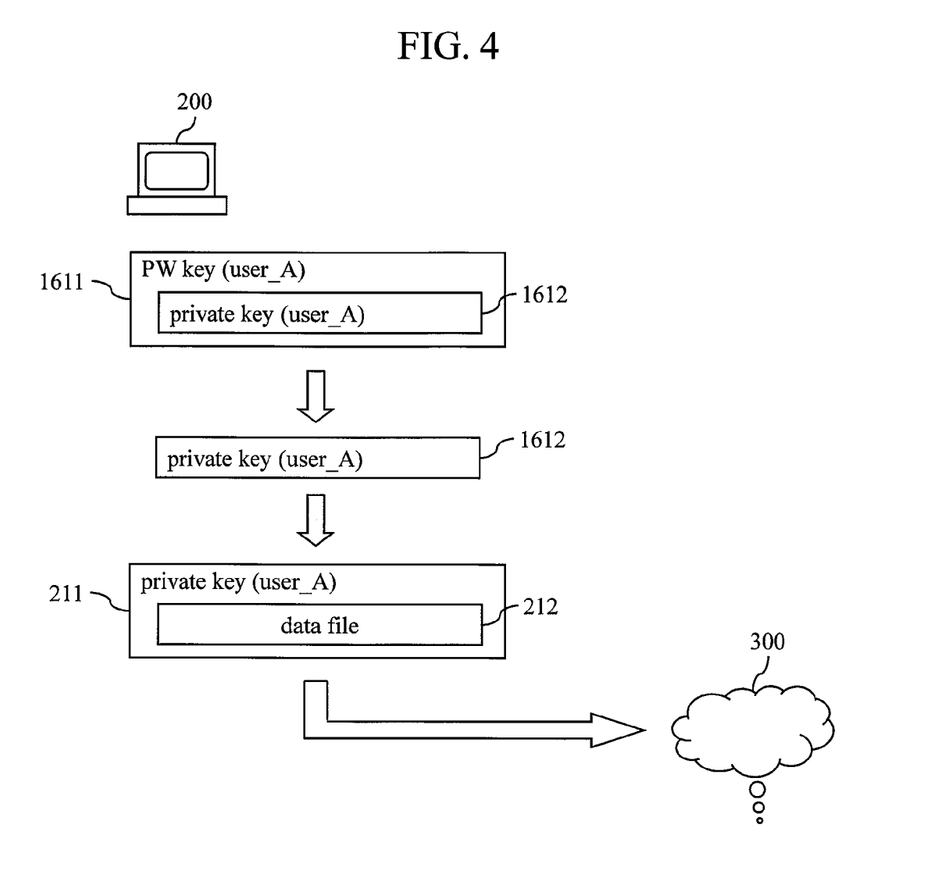
FIG. 4 is a diagram explaining a process in which a client terminal 200 encrypts a data file 212 and stores it in a cloud storage 300.

FIG. 4 is a diagram explaining a process in which the client terminal 200 encrypts a data file 212 and stores (uploads) it in the cloud storage 300. It is assumed here that only user_A uses the data file 212.

The user logins to the management server 100 and acquires each of encryption keys before storing the data file 212 in the cloud storage, as described in FIG. 3. The client terminal 200 decrypts, using the password user_A_PW, each of records acquired from the management server 100 to acquire the three encryption keys. Since the data file 212 is dedicated to user_A, the user selects the private key 1612 as an encryption key for encrypting the data file 212. The client terminal 200 encrypts the data file 212 using the private key 1612 to generate an encrypted data file 211. The client terminal 200 stores (sends) the encrypted data file 211 in the cloud storage 300.

Similarly, in a case where the data file 212 is shared among users belonging to Group_A, the user selects the group shared key 1614 as an encryption key to encrypt the data file 212. In a case where the data file 212 is shared among users not belonging to Group_A, the user selects the system shared key 1616 as an encryption key to encrypt the data file 212. The client terminal 200 encrypts the data file 212 using the selected encryption key, and stores the encrypted data file 212 in the cloud storage 300.

When encrypting the data file 212, the client terminal 200 embeds, in the encrypted data file 212, information indicating which type among the above-mentioned three types of encryption keys was used. However, since it is sufficient as long as the type of encryption key is clear, it is not necessary to embed information indicating each of encryption keys itself individually.

Figure 5:
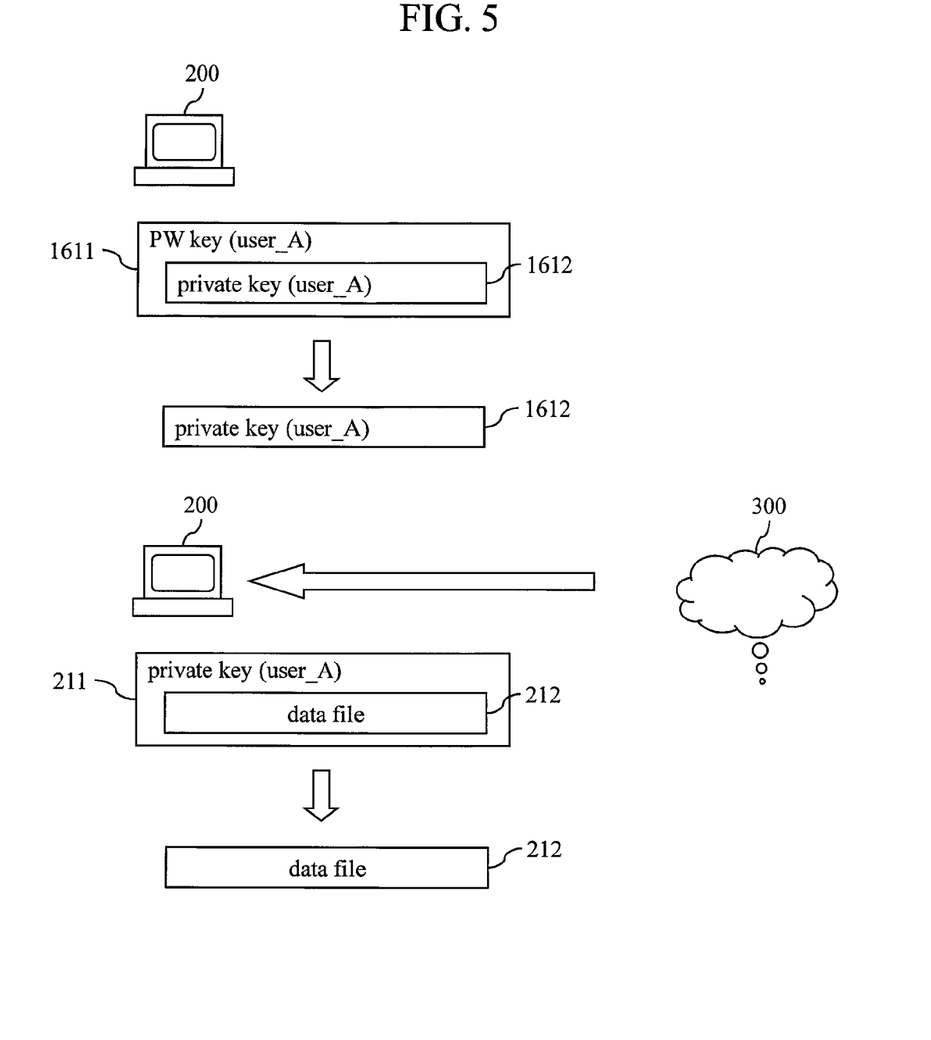
FIG. 5 is a diagram explaining a process in which the client terminal 200 retrieves the data file 212 from the cloud storage 300 and decrypts it.

FIG. 5 is a diagram explaining a process in which the client terminal 200 acquires (downloads) the data file 212 from the cloud storage 300 to decrypt it. It is assumed in FIG. 5 that only user_A uses the data file 212 as in the case of FIG. 4.

The user acquires each of encryption keys from the management server 100 before acquiring the data file 212 from the cloud storage 300 as in the case of FIG. 4. The client terminal 200 decrypts each of the encryption keys.

The user accesses the cloud storage 300 through the client terminal 200 and acquires the encrypted data file 211. A piece of information indicating that the encrypted data file 211 is encrypted using an encryption key that is unique to each of users is embedded in the encrypted data file 211. The client terminal 200 attempts to decrypt the encrypted data file 211 using a private key 1612 of user_A. If the encrypted data file 211 is encrypted using the private key 1612 of user_A, the encrypted data file 211 is decrypted to obtain the data file 212.

Similarly, if the data file 212 is shared among users belonging to Group_A, the client terminal 200 performs decryption to obtain the data file 212 using the group shared key 1614. If the data file 212 is shared among users not belonging to Group_A, the client terminal 200 performs decryption to obtain the data file 212 using the system shared key 1616.

The encrypted data file 211 stored by user_A in the cloud storage 300 may be acquired by other user (e.g. user_B). In this case, since the client terminal 200 acquires the private key 1612, the group shared key 1614, and the system shared key 1616 that are corresponding to user_B, the client terminal 200 attempts to decrypt the encrypted data file 211 using those keys. The processing pattern in this case will be described below.

(Processing Pattern No. 1)

If the data file 212 is encrypted using a private key 1612 that is unique to user_A, the client terminal 200 cannot decrypt the data file 212.

(Processing Pattern No. 2)

If user_A and user_B belong to the same group (e.g. Group_A) and the data file 212 is encrypted using a group shared key 1614 that is shared among users belonging to Group_A, it is possible to decrypt the data file 212 using a group shared key 1614 corresponding to user_B.

(Processing Pattern No. 3)

If the data file 212 is encrypted using the system shared key 1616, it is possible to decrypt the data file 212 using the system shared key 1616 corresponding to user_B.

Figure 6:
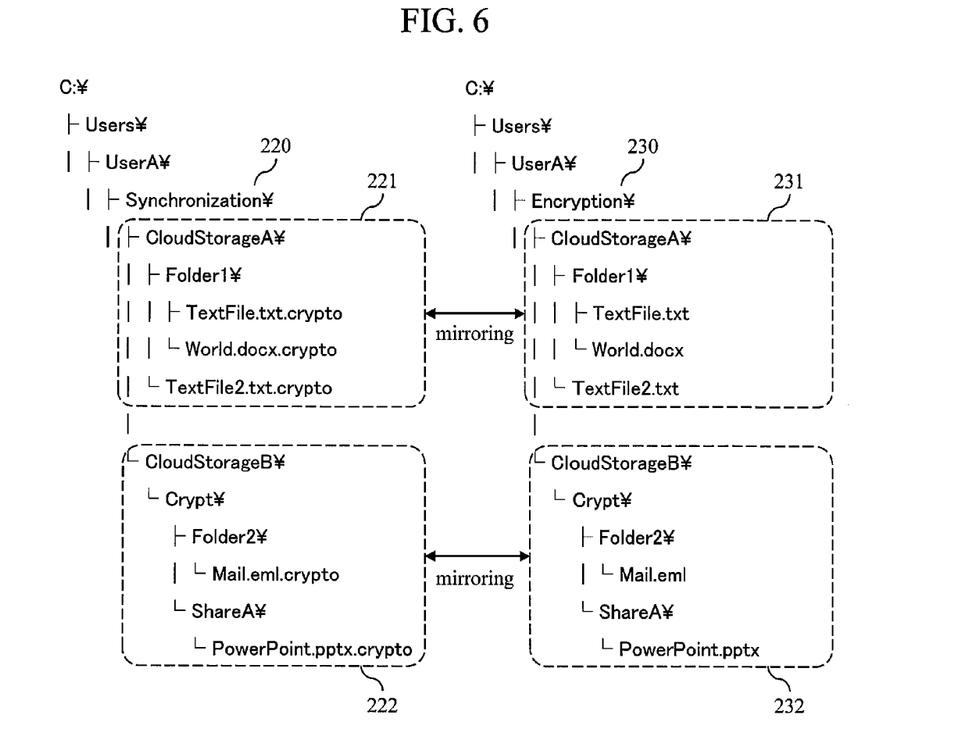
FIG. 6 is a configuration diagram of a file system on an OS of the client terminal 200.

FIG. 6 is a configuration diagram of a file system on an OS (Operating System) of the client terminal 200. As described with reference to FIGS. 4 and 5, the client terminal 200 can encrypt or decrypt each of the data file 212. However, users may be subjected to working loads because users have to select encryption keys for each of the encryptions or decryptions. Thus the client terminal 200 may collectively encrypt or decrypt data files stored in predetermined folders on the file system and may synchronize those files between the cloud storage 300. FIG. 6 explains a folder configuration example for that operation. The file system of the client terminal 200 includes a synchronization folder 220 and an encryption folder 230.

The synchronization folder 220 is a folder that stores data files which the client terminal 200 sends to the cloud storage 300 or data files which the client terminal 200 acquires from the cloud storage 300. The client terminal 200 continuously monitors the synchronization folder 220. If a new data file is stored in the synchronization folder 220, the client terminal 200 sends the data file to the cloud storage 300. In addition, the client terminal 200 periodically connects to the cloud storage 300 as long as necessary. If new encrypted data files exist on the cloud storage 300, the client terminal 200 downloads those files to store in the synchronization folder 220.

Sub folders may be provided in the synchronization folder 220. It is desirable if the folder/file structure in the synchronization folder 220 and the folder/file structure on the cloud storage 300 are synchronized with each other.

If the client terminal 200 uses a plurality of cloud storages 300, it is possible to provide, in the synchronization folder 220, sub folders corresponding to each of the cloud storages 300 and to perform synchronizations for each of the cloud storages 300. The sub folders 221 and 222 shown in FIG. 6 correspond to two cloud storages 300 (Cloud Storage A, Cloud Storage B).

The encryption folder 230 is a folder that stores data files which the client terminal 200 encrypts before sending to the cloud storage and data files decrypted from encrypted data files acquired from the cloud storage 300. The client terminal 200 continuously monitors the encryption folder 230. If a new data file is stored in the encryption folder 230, the client terminal 230 encrypts the data file and stores it in the synchronization folder 220. The data file stored in the synchronization folder 220 is sent to the cloud storage 300 as mentioned above. In addition, if a new encrypted data file is stored in the synchronization folder 220, the client terminal 200 decrypts the encrypted data file and stores it in the encryption folder 230.

The client terminal 200 synchronizes the folder/file structure in the encryption folder 230 with the folder/file structure in the synchronization folder 220. Therefore, if sub folders for each of cloud storages 300 exist in the synchronization folder 220, the same folder structure is created in the encryption folder 230. The sub folders 231 and 232 correspond to the sub folders 221 and 222 respectively. Extensions of files may be appropriately changed so as to identify whether those files are encrypted. In FIG. 6, encrypted data files have an extension of ".crypto" in addition to the original "filename+extension".

Next, a method for identifying the encryption key to be used will be described. The cloud storage 300 generally has a function for designating users who share data files for each of folders. Thus the client terminal 200 inquires to the cloud storage 300 about the users who are assumed to share data files stored in each of folders on the cloud storage 300, and specifies encryption keys to be used according to the inquiry. For example, a data file in a folder storing data files that are shared in Group_A is encrypted using a group shared key 1614 that is unique to Group_A. In FIG. 6, the folder "ShareA" in the sub folder 232 corresponds to it. Data files that are shared between groups are encrypted using the system shared key 1616. Although not shown in FIG. 6, a folder corresponding to the system shared key 1616 may be provided. Data files that do not fall under categories mentioned above are encrypted using a private key 1612.

When the client terminal 200 acquires a new encrypted data file from the cloud storage 300, a piece of information indicating which type of encryption keys is to be used is embedded in the encrypted data file, as described in FIG. 5. Thus it is possible to decrypt the encrypted data file using an encryption key corresponding to the information. Alternatively, as in a case of encrypting data files, a data file in a folder storing data files that are shared in Group_A may be decrypted using a group shared key 1614 that is unique to Group_A.

If the relation between the information embedded in the encrypted data file and the folder is contradicted, the encrypted data file may be processed according to a configuration file defining how to process it. For example, if an encrypted data file in which a piece of information indicating that the encrypted data file is encrypted using a private key 1612 is embedded is stored in a folder storing data files shared in Group_A, it is possible to attempt decrypting the encrypted data file using both a private key 1612 and a group shared key 1614 and to employ either one of the keys which was successful in the decryption. Alternatively, the encrypted data file may be stored in the encryption folder 230 without decrypting it. These processes may be applied to steps S805 to S810 described later.

Figure 7:
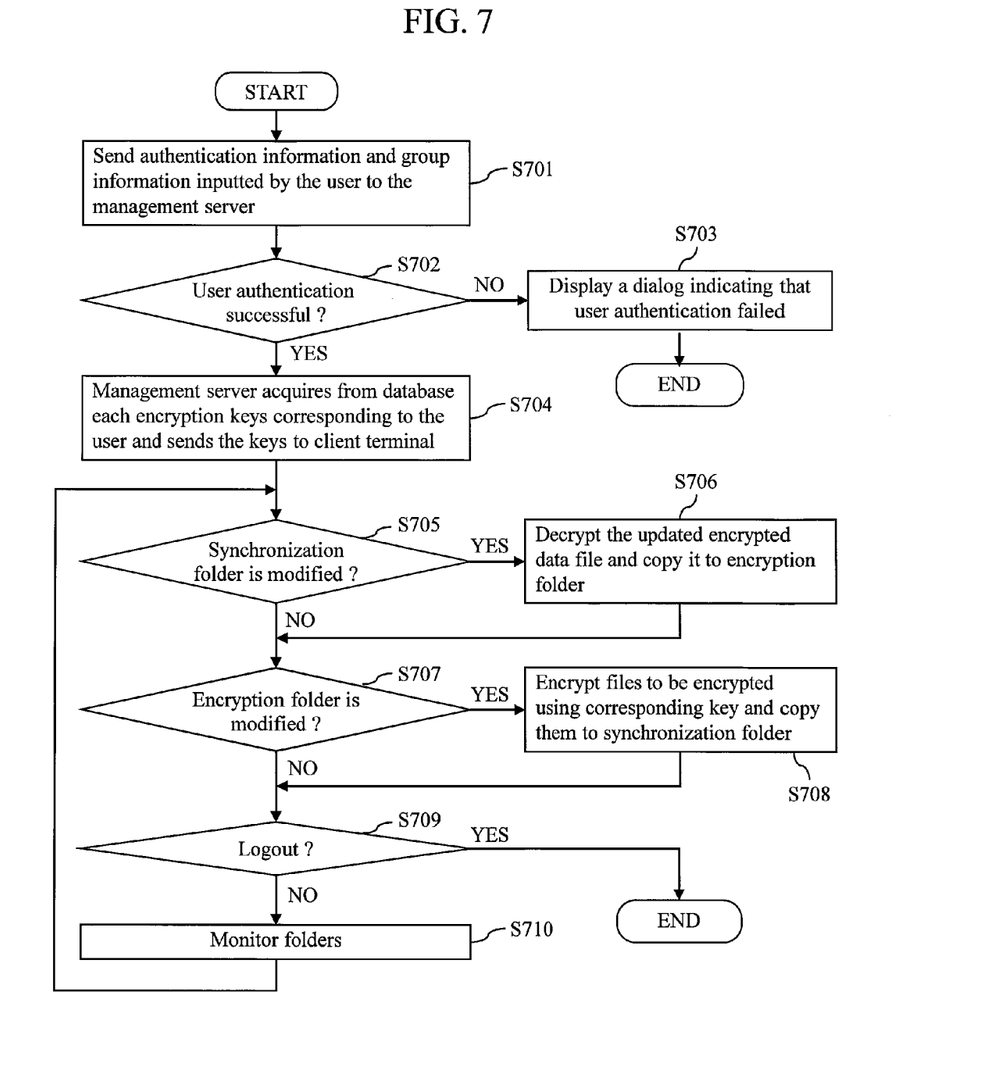
FIG. 7 is a flowchart explaining a process in which the client terminal 200 sends, to the cloud storage 300, a new data file that is stored in an encryption folder 230.

FIG. 7 is a flowchart explaining a process in which the client terminal 200 sends, to the cloud storage 300, a new data file stored in the encryption folder 230. Hereinafter, each of steps in FIG. 7 will be described.

(FIG. 7: Step S701)

The user inputs authentication information (a user ID and a password) through the client terminal 200 and specifies group information (a group ID to which the user belongs) if necessary, and sends them to the management server 100.

(FIG. 7: Steps S702 to S703)

The authentication unit 151 of the management server 100 performs a user authentication using the authentication information received from the client terminal 200 (S702). If not approving the authentication, the authentication unit 151 sends a response indicating it to the client terminal 200 and the client terminal 200 displays a dialog indicating that the user authentication failed, then this flowchart terminates. If approving the authentication, the flowchart proceeds to step S704.

(FIG. 7: Step S704)

The send unit 152 acquires, from the database 160, a private key 1612, a group shared key 1614, and a system shared key 1616 that are corresponding to the user, and sends those keys to the client terminal 200. As described with reference to FIG. 3, those three keys are encrypted using the PW key 1618. Thus the client terminal 200 decrypts those encryption keys using the authentication information of the user.

(FIG. 7: Step S705)

The client terminal 200 compares the file structure stored in the synchronization folder 220 with the file structure stored in the encryption folder 230 to determine whether the file structure stored in the synchronization folder 230 includes additions or updates. If additions or updates are included, the flowchart proceeds to step S706. If not, the flowchart skips to step S707.

(FIG. 7: Step S706)

The client terminal 200 decrypts the encrypted data file using a corresponding encryption key according to the information embedded in the encrypted data file, and copies the decrypted file to the encryption folder 230. If the encrypted data file in the synchronization folder 230 is deleted, the data file corresponding to the deleted file in the encryption folder 230 is deleted.

(FIG. 7: Step S707)

The client terminal 200 periodically checks whether the file structure in the encryption folder 230 includes additions or updates. If additions or updates are included, the flowchart proceeds to step S708. If not, the flowchart skips to step S709.

(FIG. 7: Step S708)

The client terminal 200 encrypts the added or updated data file in the encryption folder 230 using a corresponding encryption key, and copies it to the synchronization folder 220. The client terminal 200 uploads, to the cloud storage 300, the encrypted data file copied to the synchronization folder 220.

(FIG. 7: Steps S709 to S710)

The client terminal 200 determines whether the user logged out (S709). If the user logged out, the client terminal 200 stops monitoring the encryption folder 230. If not, the flowchart returns to step S705 and same processes are repeated (S710).

Figure 8:
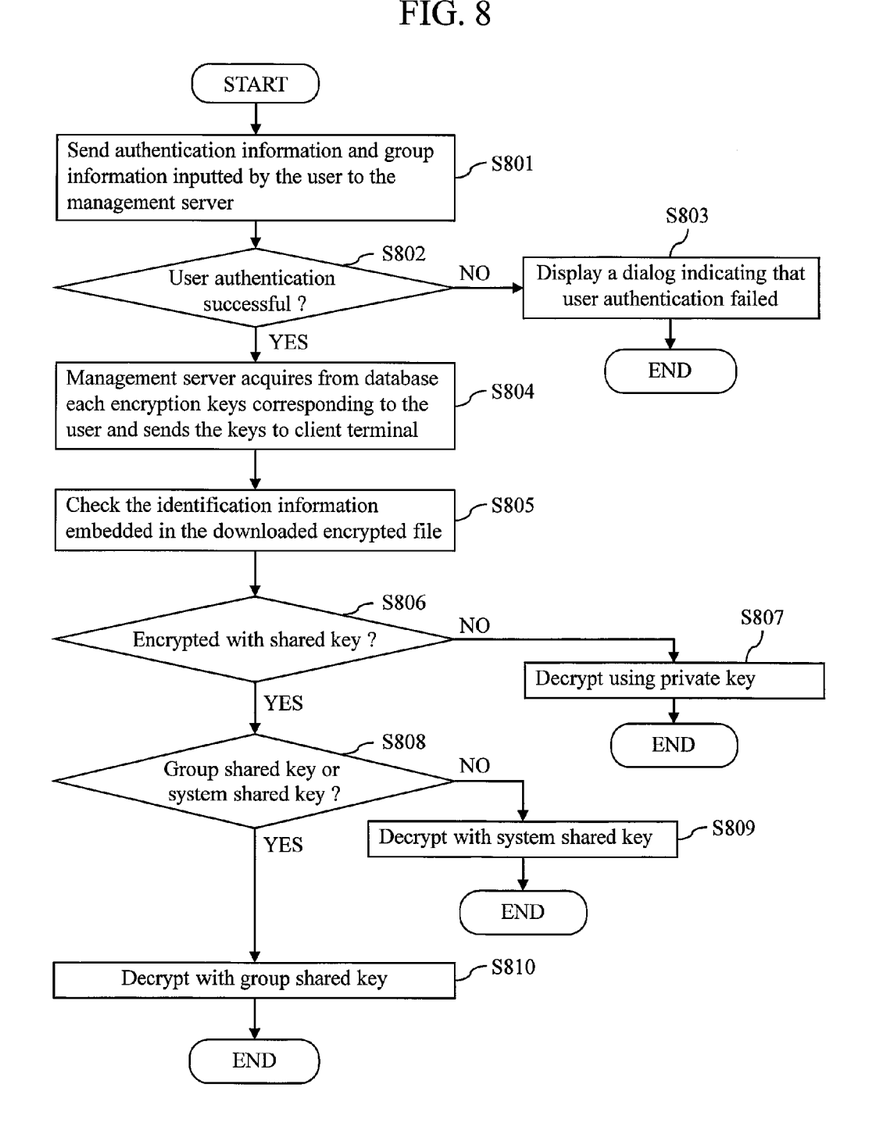
FIG. 8 is a flowchart explaining a process in which the client terminal 200 downloads an encrypted data file from the cloud storage 300.

FIG. 8 is a flowchart in which the client terminal 200 downloads an encrypted data file from the cloud storage 300. Steps S801 to S804 are analogous to steps S701 to S704 in FIG. 7. Thus step S805 and steps thereafter will be described below.

(FIG. 8: S805)

The client terminal 200 stores, in the synchronization folder 220, an encrypted data file downloaded from the cloud storage 300. The client terminal 200 checks the identification information embedded in the encrypted data file downloaded from the cloud storage 300, thereby specifying the encryption key to be used in the decryption process.

(FIG. 8: S806 to S810)

The client terminal 200 decrypts the encrypted data file using a corresponding encryption key according to the determination in step S805. The data file acquired by the decryption is stored in a corresponding folder in the encryption folder 230.

SUMMARY OF THE PRESENT INVENTION

As discussed above, the management server 100 in the present invention has the record 1613 including a group shared key 1614 that is shared among users belonging to the same user group, the group shared key 1614 being encrypted using PW keys 1618 of each users. The management server 100 sends the record 1613 corresponding to each users in response to requests from the client terminal 200. Since the group shared key 1614 is common in the group, users belonging to the same group can acquire the same group shared key 1614 even if the group shared key 1614 is encrypted using different PW keys 1618 respectively. As a result, even if the encrypted data file 211 is shared between other users in the group, it is not necessary to notify passwords to each other. Thus it is possible to keep the convenience of the cloud storage 300 as well as to encrypt data files on the cloud storage 300 to improve the security.

In addition, with the management server 100 in the present invention, even if two of three components, namely the encrypted data file 211 on the cloud storage, each of encrypted encryption keys managed on the management server 100, and authentication information such as passwords which only users know are leaked, it is impossible to decrypt the encrypted data file 211 unless all of the three components are acquired. Therefore, it is possible to improve the security of whole of the data management system 1000. This feature is common for any of the encryption keys.

In addition, the client terminal 200 in the present invention provides, both in the synchronization folder 220 and in the encryption folder 230, sub folders corresponding to each of cloud storages 300 and synchronizes data files in each folders for each of the cloud storages 300. As a result, it is possible to use, without being affected by the difference of specifications of the cloud storages 300, a plurality of different cloud storages 300 with a unified operational feeling and an interface.

In addition, the client terminal 200 in the present invention inquires to the cloud storage 300 the rule about users who share data files on the cloud storage 300, and encrypts or decrypts data files using encryption keys configured for each of folders corresponding to the rule. As a result, the user only has to be aware of the folders in which data files to be shared with other users are stored, and it is not necessary to be aware of encryption keys that are used for encrypting data files. Therefore, it is more convenient than in a case where each of data files is encrypted using passwords. It is also preferable in terms of security because it is not necessary to notify passwords to other users.

In addition, the client terminal 200 in the present invention embeds a piece of information indicating the encryption key that was used when encrypting the data file 212, and uses a corresponding encryption key with reference to the information when decrypting the encrypted data file 211. As a result, it is not necessary for users to select types of the encryption key or encryption schemes for each of encryptions. Thus it is possible to improve convenience for users.

<Modified Example of the Present Invention>

The present invention is not limited to the aforementioned embodiments, and various modifications are possible. The above-described embodiments are directed to detailed explanation for clear understanding of the present invention, and the present invention is not limited to the configuration having all described components. In addition, a part of a configuration of an embodiment may be replaced with a configuration in another embodiment. Further, a configuration is an embodiment may be added to a configuration in another embodiment. Yet further, a part of a configuration in an embodiment may be appended, deleted, or replaced by another configuration.

For example, in the aforementioned embodiments, it is assumed that encryption key and decryption key are the same. However, the present invention may be applied to a case where encryption key is different from decryption key (e.g. public key encryption scheme). In this case, the management server 100 may manage the pair of encryption key and decryption key, and the client terminal 200 may notify which one of the encryption key and the decryption key is required.

In addition, in the aforementioned embodiments, passwords are used as authentication information for authenticating users. However, other authentication information may be used as long as the client terminal 200 can decrypt each of the encryption keys.

In addition, in the aforementioned embodiments, folder structures under Windows (registered trademark) are assumed. However, the same scheme may be provided on other OSs.

DESCRIPTION OF SYMBOLS

100: management server, 110: private key encryption unit, 120: group shared key encryption unit, 130: system shared key encryption unit, 140: PW key encryption unit, 150: encryption key send unit, 160: database, 1612: private key, 1614: group shared key, 1616: system shared key, 1618: PW key, 162: management key, 200: client terminal, 300: cloud storage, 400: network

What is claimed is:

1. A non-transitory computer readable medium storing an encryption key management program that causes a computer to perform a process for managing an encryption key, the encryption key management program, when executed by the computer, causes the computer to execute:

a group shared key encryption step of encrypting, using authentication information used for authenticating each of a plurality of users, a group shared key, that is an encryption key shared and used by the plurality of users in one group, of a plurality of groups, that the plurality of users belong, to create an encrypted group shared key, and storing the encrypted group shared key in a storage device; and an encryption key sending step of performing, upon receiving a request to send an encryption key, a user authentication with respect to a client terminal that issued the request, and sending as a response to the request the encrypted group shared key corresponding to a user of the user authentication if the user authentication is approved, wherein in the group shared key encryption step, the encryption key management program causes the computer to create the encrypted group shared key so that the group shared key obtained by decrypting the encrypted group shared key becomes an encryption key that is different for each of the plurality of groups, wherein the encryption key management program further causes the computer to execute a private key encryption step of encrypting, using user authentication information for authenticating each user, a private key, that is an encryption key unique to each user and is used by each user individually, to create an encrypted private key, and storing the encrypted private key in a storage device, and wherein in the encryption key sending step, if the user authentication is approved, the encryption key management program causes the computer to send the encrypted private key corresponding to a user of the user authentication along with the encrypted group shared key as a response to the request.

2. The non-transitory computer readable medium according to claim 1, wherein the encryption key management program causes the computer to execute a step of encrypting, using a management key that is an encryption key which is used commonly among each of the users and each of the groups, an encryption key that is used for encrypting the group shared key and storing the encrypted encryption key in the storage device.

3. A data management system comprising:
a server having the computer that executes the encryption key management program according to claim 1,
wherein a client terminal that issues the request to the server,
wherein the client terminal acquires the group shared key and the private key by decrypting, using the authentication information, the encrypted group shared key and the encrypted private key received as a response to the request,
wherein the client terminal encrypts data using the group shared key or the private key and stores the encrypted data in the server,
wherein in a case where the data is encrypted using the group shared key, the client terminal embeds, in the data, first information indicating that the data is encrypted using an encryption key shared in a group to which a plurality of users belong, and
wherein in a case where the data is encrypted using the private key, the client terminal embeds, in the data, second information indicating that the private key is encrypted using an encryption key which is only used by the user of the client terminal.

4. The data management system according to claim 3, wherein
the client terminal acquires the data from the server as well as acquires the group shared key and the private key by decrypting the data using the authentication information,
if the first information is embedded in the data, the client terminal decrypts the data using the group shared key, and
if the second information is embedded in the data, the client terminal decrypts the data using the private key.

5. The data management system according to claim 3, wherein
the client terminal encrypts, using the group shared key, data stored in a first folder on a file system and stores the encrypted data in the server, and
the client terminal encrypts, using the private key, data stored in a second folder on the file system and stores the encrypted data in the server.

6. The data management system according to claim 3, wherein
the client terminal decrypts, using the group shared key, data stored in a third folder on a file system, and
the client terminal decrypts, using the private key, data stored in a fourth folder on the file system.

7. The data management system according to claim 1, wherein the encryption key management program belongs to a service provider which is different from that of the storage device.

8. A non-transitory computer readable medium storing an encryption key management program that causes a computer to perform a process for managing an encryption key, the encryption key management program, when executed by the computer, causes the computer to execute:
a group shared key encryption step of encrypting, using authentication information used for authenticating each of a plurality of users, a group shared key that is an encryption key shared and used by the plurality of users in one group, of a plurality of groups, that the plurality of users belong, to create an encrypted group shared key, and storing the encrypted group shared key in a storage device; and
an encryption key sending step of performing, upon receiving a request to send an encryption key, a user authentication with respect to a client terminal that issued the request, and sending as a response to the request the encrypted group shared key corresponding to a user of the user authentication if the user authentication is approved,
wherein in the group shared key encryption step, the encryption key management program causes the computer to create the encrypted group shared key so that the group shared key obtained by decrypting the encrypted group shared key becomes an encryption key that is different for each of the plurality of groups,
wherein the encryption key management program causes the computer to execute a system shared key encryption step of encrypting, using user authentication information for authenticating each of the users, a system shared key, that is an encryption key, which is used by users who do not belong to any of the groups to decrypt data that is shared between users of at least one of the plurality of groups and the users who do not belong to any of the plurality of groups, to create an encrypted system shared key and storing the encrypted system shared key in a storage device, and
wherein in the encryption key sending step, if the user authentication is approved, the encryption key management program causes the computer to send the encrypted system shared key corresponding to a user of the user authentication along with the encrypted group shared key as a response to the request.

9. An encryption key management apparatus that manages an encryption key, comprising:
a group shared key encryption unit that encrypts, using authentication information used for authenticating each of a plurality of users, a group shared key, that is an encryption key shared and used by the plurality of users in one group, of a plurality of groups, that the plurality of users belong, to create an encrypted group shared key, and that stores the encrypted group shared key in a storage device; and
an encryption key sending unit that performs, upon receiving a request to send an encryption key, a user authentication with respect to a client terminal that issued the request, and that sends as a response to the request the encrypted group shared key corresponding to a user of the user authentication if the user authentication is approved,
wherein the group shared key encryption unit creates the encrypted group shared key so that the group shared key obtained by decrypting the encrypted group shared key becomes an encryption key that is different for each of the plurality of groups,
wherein the encryption key management apparatus further comprises a private key encryption unit that encrypts, using user authentication information for authenticating each user, a private key, that is an encryption key unique to each user and is used by each user individually, to create an encrypted private key, and stores the encrypted private key in a storage device, and
wherein the encryption key sending unit, if the user authentication is approved, sends the encrypted private key corresponding to a user of the user authentication along with the encrypted group shared key as a response to the request.

10. An encryption key management apparatus that manages an encryption key, comprising:
- a group shared key encryption unit that encrypts, using authentication information used for authenticating each of a plurality of users, a group shared key, that is an encryption key shared and used by the plurality of users in one group, of a plurality of groups, that the plurality of users belong, to create an encrypted group shared key, and that stores the encrypted group shared key in a storage device; and
- an encryption key sending unit that performs, upon receiving a request to send an encryption key, a user authentication with respect to a client terminal that issued the request, and that sends as a response to the request the encrypted group shared key corresponding to a user of the user authentication if the user authentication is approved,
- wherein the group shared key encryption unit creates the encrypted group shared key so that the group shared key obtained by decrypting the encrypted group shared key becomes an encryption key that is different for each of the plurality of groups,
- wherein the encryption key management apparatus further comprises a system shared key encryption unit that encrypts, using user authentication information for authenticating each of the users, a system shared key, that is an encryption key, which is used by users who do not belong to any of the groups to decrypt data that is shared between users of at least one of the plurality of groups and the users who do not belong to any of the plurality of groups, to create an encrypted system shared key and storing the encrypted system shared key in a storage device, and
- wherein the encryption key sending unit, if the user authentication is approved, sends the encrypted system shared key corresponding to a user of the user authentication along with the encrypted group shared key as a response to the request.

* * * * *